US012779701B2

(12) United States Patent
Shimizu et al.

(10) Patent No.: US 12,779,701 B2
(45) Date of Patent: Nov. 3, 2026

(54) SUBSTRATE HOLDING HAND AND SUBSTRATE CONVEYING ROBOT

(71) Applicant: KAWASAKI JUKOGYO KABUSHIKI KAISHA, Kobe (JP)

(72) Inventors: Ippei Shimizu, Kobe (JP); Ryunosuke Takauji, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 915 days.

(21) Appl. No.: 18/024,584

(22) PCT Filed: Nov. 2, 2020

(86) PCT No.: PCT/JP2020/041027
§ 371 (c)(1),
(2) Date: Mar. 3, 2023

(87) PCT Pub. No.: WO2022/049784
PCT Pub. Date: Mar. 10, 2022

(65) Prior Publication Data

US 2024/0025054 A1 Jan. 25, 2024

(30) Foreign Application Priority Data

Sep. 3, 2020 (JP) ................................ 2020-148491

(51) Int. Cl.
*B25J 15/00* (2006.01)
*B25J 11/00* (2006.01)

(52) U.S. Cl.
CPC ....... *B25J 15/0014* (2013.01); *B25J 11/0095* (2013.01)

(58) Field of Classification Search
CPC ............... B25J 15/0014; B25J 11/0095; B25J 15/0052; H10P 72/30; H10P 72/7602
See application file for complete search history.

(56) References Cited

U.S. PATENT DOCUMENTS 5,556,147 A * 9/1996 Somekh .................. H10P 72/78 294/185
5,697,748 A * 12/1997 Somekh ............. H10P 72/3306 414/217
6,132,165 A * 10/2000 Carducci ............ H10P 72/7602 414/744.5

FOREIGN PATENT DOCUMENTS

JP 2006-313865 A 11/2006
JP 2010-179420 A 8/2010
KR 10-2010-0047532 A 5/2010

* cited by examiner

*Primary Examiner* — Catherine Loikith
(74) *Attorney, Agent, or Firm* — Oliff PLC

(57) ABSTRACT

A substrate holding hand includes a frame, a plurality of blades each to support a substrate, and a mounting member to support the plurality of blades and mount the plurality of blades to the frame. The plurality of blades are aligned in a direction perpendicular to main surfaces of the blades, and among the plurality of blades, an intermediate blade is removable from the mounting member while an end blade located at an end in the direction perpendicular to the main surfaces of the blades is attached to the mounting member.

12 Claims, 8 Drawing Sheets

SUBSTRATE HOLDING HAND AND SUBSTRATE CONVEYING ROBOT

TECHNICAL FIELD

The present invention relates to a substrate holding hand and a substrate conveying robot, and relates to a substrate holding hand and a substrate conveying robot each including a plurality of blades, each of which supports a substrate.

BACKGROUND ART

Conventionally, a substrate holding hand including a plurality of blades, each of which supports a substrate, is known. Such a hand is disclosed in Japanese Patent Laid-Open No. 2006-313865, for example.

Japanese Patent Laid-Open No. 2006-313865 discloses a robot arm (substrate holding hand) that conveys a substrate. This robot arm includes a plurality of (five) thin plate-shaped end effectors (blades), each of which supports a substrate. The plurality of end effectors are attached to end effector mounting plates so as to be aligned in a direction perpendicular to the main surfaces of the end effectors.

Although not clearly described in Japanese Patent Laid-Open No. 2006-313865, in a conventional robot arm as described in Japanese Patent Laid-Open No. 2006-313865, end effectors are conceivably removed from end effector mounting plates in order from a first side to a second side in a direction perpendicular to the main surfaces of the end effectors when the end effectors are removed from the end effector mounting plates. That is, in this conventional robot arm, the intermediate end effector cannot be conceivably removed from the end effector mounting plate unless the end effector located at the end in the direction perpendicular to the main surfaces of the end effectors is removed from the end effector mounting plate.

PRIOR ART

Patent Document

Patent Document 1: Japanese Patent Laid-Open No. 2006-313865

SUMMARY OF THE INVENTION

Problems to be Solved by the Invention

In the conventional robot arm, the intermediate end effector cannot be removed without removing the end effector at the end, and thus it is difficult to remove the intermediate end effector (blade) from the mounting member while maintaining the level (horizontal state) of the end effector (blade) at the end in order to perform work such as maintenance on the intermediate end effector (blade).

The present invention aims to provide a substrate holding hand and a substrate conveying robot that each allow an intermediate blade (a blade adjacent to an end blade) to be removed from a mounting member while the level (horizontal state) of an end blade is maintained to perform work such as maintenance on the intermediate blade (the blade adjacent to the end blade).

Means for Solving the Problems

A substrate holding hand according to a first aspect of the present invention includes a frame, a plurality of blades each to support a substrate, and a mounting member to support the plurality of blades and mount the plurality of blades to the frame. The plurality of blades are aligned in a direction perpendicular to main surfaces of the blades, and among the plurality of blades, an intermediate blade is removable from the mounting member while an end blade located at an end in the direction perpendicular to the main surfaces of the blades is attached to the mounting member.

A substrate holding hand according to a second aspect of the present invention includes a frame, a plurality of blades each to support a substrate, and a mounting member to support the plurality of blades and mount the plurality of blades to the frame. The plurality of blades are aligned in a direction perpendicular to main surfaces of the blades, among the plurality of blades, an end blade located at an end in the direction perpendicular to the main surfaces of the blades and a blade adjacent to the end blade are removable from a same side in the direction perpendicular to the main surfaces of the blades, and the blade adjacent to the end blade is removable from the mounting member while the end blade is attached to the mounting member.

A substrate conveying robot according to a third aspect of the present invention includes a substrate holding hand and an arm to move the substrate holding hand. The substrate holding hand includes a frame, a plurality of blades each to support a substrate, and a mounting member to support the plurality of blades and mount the plurality of blades to the frame. The plurality of blades are aligned in a direction perpendicular to main surfaces of the blades, and among the plurality of blades, an intermediate blade is removable from the mounting member while an end blade located at an end in the direction perpendicular to the main surfaces of the blades is attached to the mounting member.

Effect of the Invention

According to the present invention, as described above, among the plurality of blades, the intermediate blade (the blade adjacent to the end blade) can be removed from the mounting member while the end blade located at the end in the direction perpendicular to the main surfaces of the blades is attached to the mounting member. Thus, unlike a case in which it is necessary to collectively remove the plurality of blades, the intermediate blade (the blade adjacent to the end blade) can be removed from the mounting member while the end blade is attached to the mounting member, and thus the intermediate blade (the blade adjacent to the end blade) can be removed from the mounting member while the level (horizontal state) of the end blade is maintained to perform work such as maintenance on the intermediate blade (the blade adjacent to the end blade).

MODES FOR CARRYING OUT THE INVENTION

Embodiments embodying the present invention are hereinafter described on the basis of the drawings.

First Embodiment

The configuration of a substrate conveying robot 100 according to a first embodiment is now described with reference to FIGS. 1 to 8.

Figure 1:
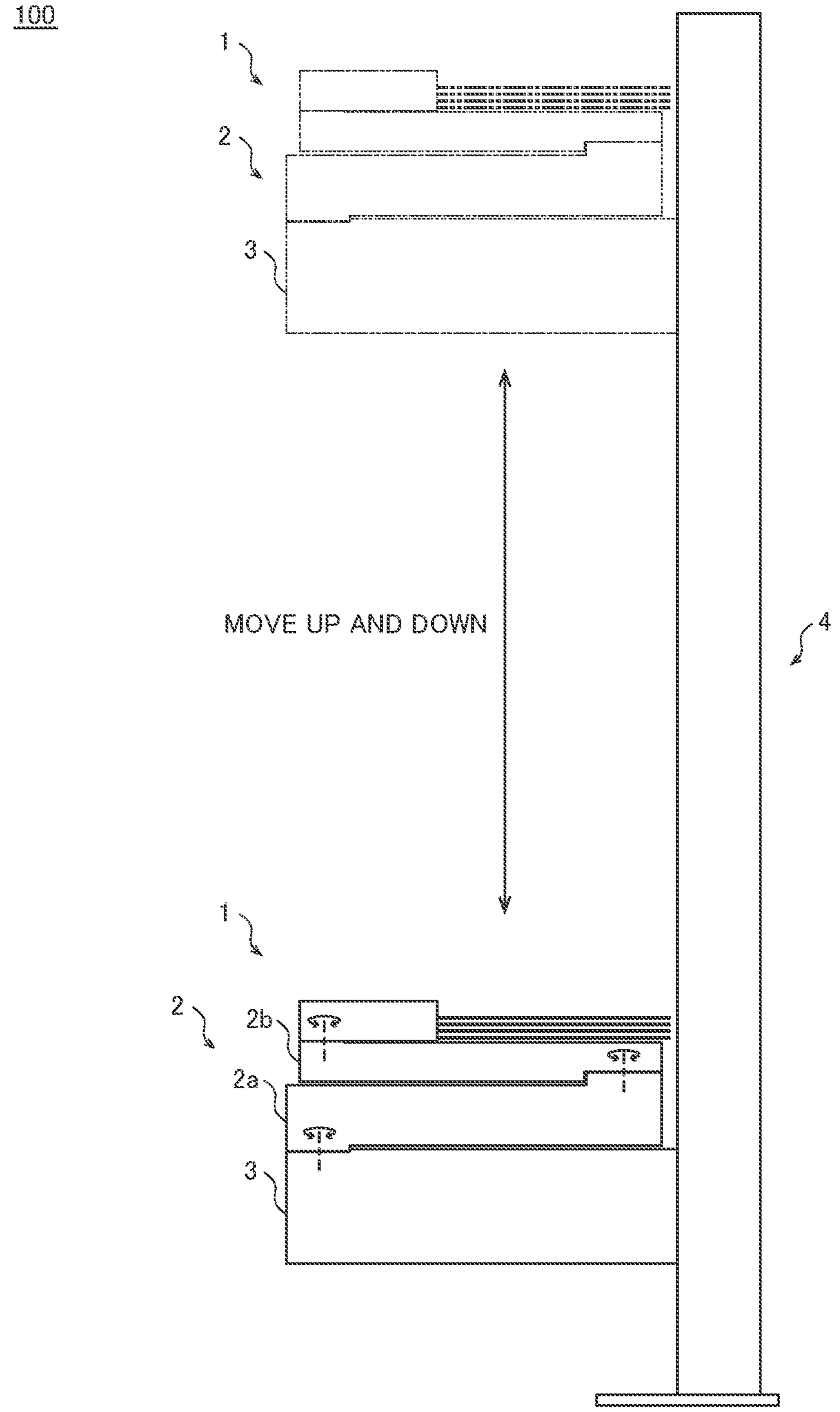
FIG. 1 is a diagram showing the configuration of a substrate conveying robot according to a first embodiment of the present invention.

As shown in FIG. 1, the substrate conveying robot 100 includes a substrate holding hand 1 and an arm 2 that moves the substrate holding hand 1. As shown in FIGS. 2 to 8, the substrate holding hand 1 includes a frame 10, a plurality of (four) blades 20 to support substrates (semiconductor wafers) W, respectively, and mounting members 30 to support the plurality of blades 20 and mount the plurality of blades 20 to the frame 10. The plurality of (four) blades 20 are aligned in a direction (Z direction) perpendicular to the main surfaces 20*a* of the blades 20, and the intermediate blade 20 (second or third stage blade 20) can be removed from the mounting members while the end blade 20 (first or fourth stage blade 20) located at the end in the direction (Z direction) perpendicular to the main surfaces 20*a* of the blades 20 is attached to the mounting members 30.

According to the first embodiment, as described above, among the plurality of blades 20, the intermediate blade can be removed from the mounting members 30 while the end blade 20 located at the end in the direction (Z direction) perpendicular to the main surfaces 20*a* of the blades 20 is attached to the mounting members 30. Thus, unlike a case in which it is necessary to collectively remove the plurality of blades 20, the intermediate blade can be removed from the mounting members 30 while the end blade 20 is attached to the mounting members 30, and thus the intermediate blade 20 can be removed from the mounting members 30 while the level (horizontal state) of the end blade 20 is maintained to perform work such as maintenance on the intermediate blade 20.

As shown in FIGS. 3 to 8, the end blade 20 includes insertion holes 21 to allow fastening members 41 that fasten and fix the end blade 20 to the mounting members 30 to be inserted therethrough, and insertion holes 22 to allow fastening members 42 that fasten and fix the intermediate blade 20 to the mounting members 30 to be inserted therethrough and to allow the fastening members 42 to be exposed as viewed in the direction (Z direction) perpendicular to the main surfaces 20*a* of the blades 20. A tool (hexagonal wrench) T is inserted into a hexagonal hole 42*a* in the head of each of the fastening members 42 exposed through the insertion holes 22 as viewed in the direction (Z direction) perpendicular to the main surfaces 20*a* of the blades 20 to remove the fastening members 42 through the insertion holes 22 such that the intermediate blade 20 can be removed from the mounting members 30 while the end blade 20 is attached to the mounting members 30 by the fastening members 41. The fastening members 41 and 42 are examples of a “first fastening member” and a “second fastening member” in the claims, respectively. The insertion holes 21 and 22 are examples of a “first insertion hole” and a “second insertion hole” in the claims, respectively.

The insertion holes 22 have a size that allows the tool (hexagonal wrench) T for removing the fastening members 42 to be inserted thereinto.

The insertion holes 22 have a size that allows the fastening members 42 to be inserted thereinto.

The fastening members 41 are exposed while being inserted through the insertion holes 21. The tool (hexagonal wrench) T is inserted into a hexagonal hole 41*a* in the head of each of the exposed fastening members 41 to remove the fastening members 41 such that the end blade 20 can be removed from the mounting members 30 while the intermediate blade 20 is attached to the mounting members 30 by the fastening members 42.

Each of the mounting members 30 includes first supports 31 that support the end blades 20 and a second support 32 that supports the intermediate blades 20. The first supports 31 include fastening holes 31*a* overlapping the insertion holes 21 in the direction (Z direction) perpendicular to the main surfaces 20*a* of the blades 20, to which the fastening members 41 inserted through the insertion holes 21 are fastened, and insertion holes 31*b* overlapping the insertion holes 22 in the direction (Z direction) perpendicular to the main surfaces 20*a* of the blades 20, through which the fastening members 42 inserted through the insertion holes 22 are inserted. The second support 32 includes fastening holes 32*a* overlapping the insertion holes 22 and the insertion holes 31*b* in the direction (Z direction) perpendicular to the main surfaces 20*a* of the blades 20, to which the fastening members 42 are fastened. The fastening holes 31*a*, the insertion holes 31*b*, and the fastening holes 32*a* are examples of a “first fastening hole”, a “third insertion hole”, and a “second fastening hole” in the claims, respectively.

The second support 32 supports the intermediate blades 20 adjacent to each other in the direction (Z direction) perpendicular to the main surfaces 20*a* of the blades 20 in common.

The insertion holes 21 include pairs of insertion holes 21. The insertion holes 22 include pairs of insertion holes 22. The pairs of insertion holes 21 and the pairs of insertion holes 22 are arranged at corners of rectangles, and are arranged on different diagonal lines of the rectangles.

The substrate holding hand 1 further includes plates 50 including insertion holes 51 overlapping the insertion holes 21 in the direction (Z direction) perpendicular to the main surfaces 20*a* of the blades 20, through which the fastening members 41 are inserted, and insertion holes 52 overlapping the insertion holes 22 in the direction (Z direction) perpendicular to the main surfaces 20*a* of the blades 20, through which the fastening members 42 are inserted. The end blades 20 are fastened and fixed by the fastening members 41 via the plates 50.

Among the plurality of blades 20, the intermediate blades 20 can be removed from the mounting members 30 while the end blades 20 are attached to the mounting members 30 on both of a first side (Z1 direction side) and a second side (Z2 direction side) in the direction (Z direction) perpendicular to the main surfaces 20*a* of the blades 20.

The intermediate blades 20 are adjacent to the end blades 20 in the direction (Z direction) perpendicular to the main surfaces 20*a* of the blades 20.

As shown in FIG. 1, the arm 2 is a horizontal articulated robot arm. The arm 2 includes a first arm 2*a* and a second arm 2*b*. The first arm 2*a* is rotatable with respect to a base 3, which is described below, with a first end as the center of rotation. Specifically, the first end of the first arm 2*a* is rotatably connected to the base 3 via a first joint. The second arm 2*b* is rotatable with respect to the first arm 2*a* with a first end as the center of rotation. Specifically, the first end of the second arm 2*b* is rotatably connected to a second end of the first arm 2*a* via a second joint. The substrate holding hand 1 is rotatably connected to a second end of the second arm 2*b* via a third joint. A drive mechanism including a servomotor corresponding to a drive source for rotary drive, a rotational position sensor that detects the rotational position of an output shaft of the servomotor, and a power transmission mechanism that transmits the output of the servomotor to the joint is provided at each of the first joint, the second joint, and the third joint.

The substrate conveying robot 100 further includes the base 3 to which the arm 2 is attached, and an arm elevating mechanism 4 to which the base 3 is attached. A first end of the base 3 is connected to the first end of the first arm 2*a*, and a second end of the base 3 is connected to the arm elevating mechanism 4. The arm elevating mechanism 4 moves the arm 2 up and down by moving the base 3 up and down. The arm elevating mechanism 4 includes a servomotor corresponding to a drive source for up-down drive, a rotational position sensor that detects the rotational position of an output shaft of the servomotor, and a power transmission mechanism that transmits the output of the servomotor to the base 3 (arm 2).

Figure 2:
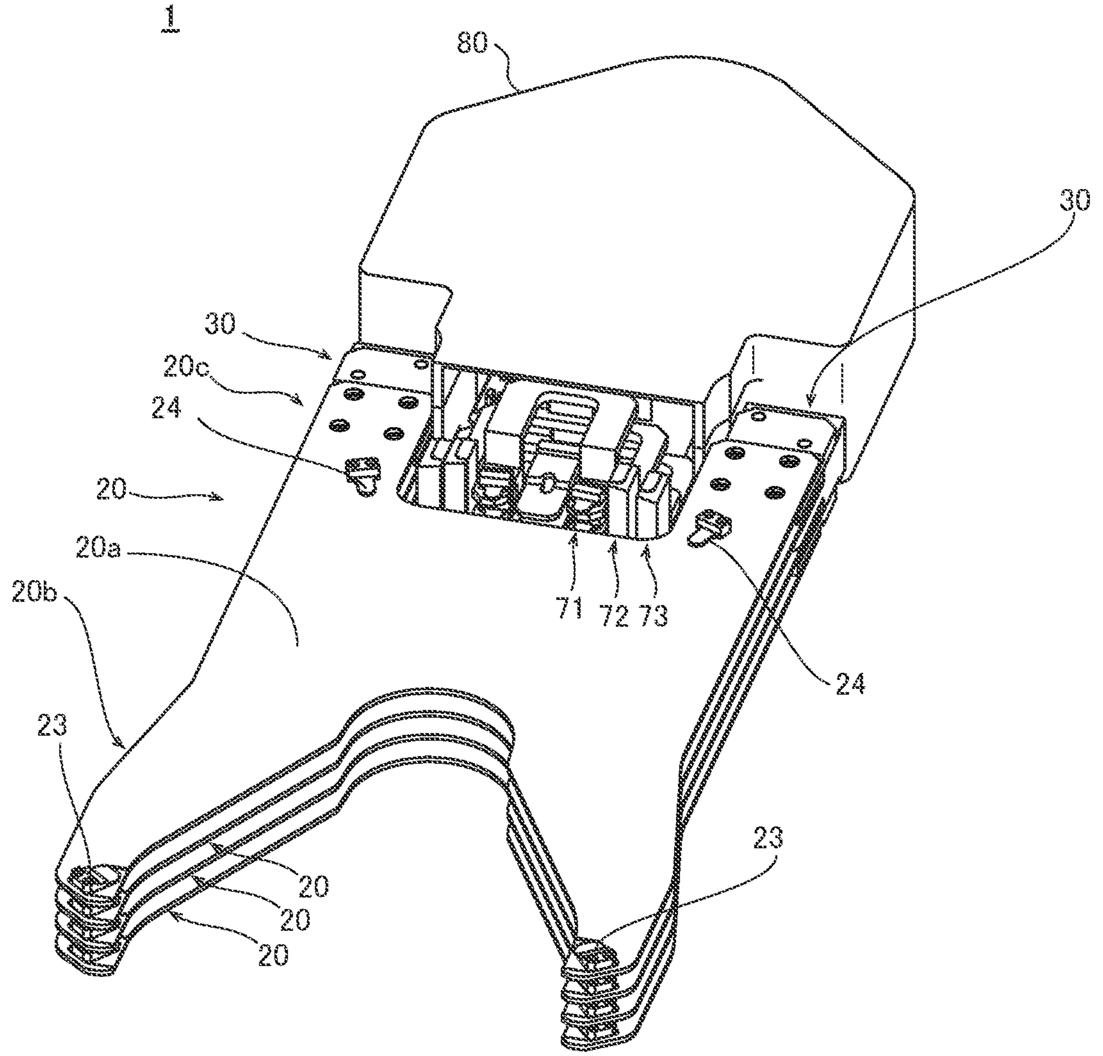
FIG. 2 is a perspective view showing the configuration of a substrate holding hand according to the first embodiment of the present invention.

As shown in FIG. 2, the substrate holding hand 1 includes the plurality of (four) blades 20. That is, the substrate holding hand 1 can convey (hold) a plurality of (four) substrates W.

Figure 3:
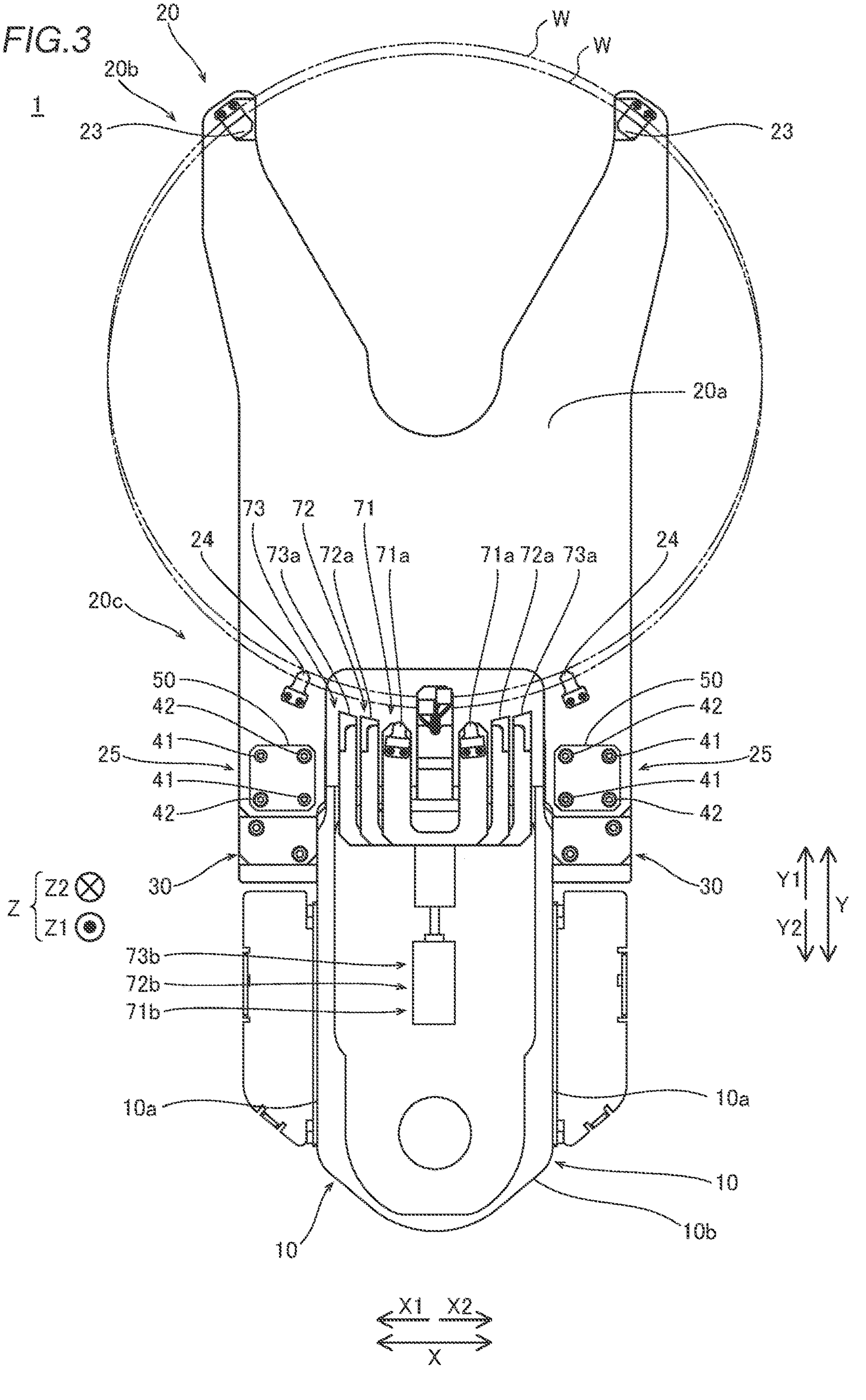
FIG. 3 is a plan view showing the configuration of the substrate holding hand according to the first embodiment of the present invention.

As shown in FIGS. 2 and 3, the substrate holding hand 1 includes the frame 10, the blades 20, and the mounting members 30. The frame 10 is a support that supports the blades 20. The frame 10 includes a pair of side walls 10*a* and a base end 10*b* connecting the pair of side walls 10*a*. The pair of side walls 10*a* are spaced apart from each other such that the wall surfaces thereof face each other in a direction (X direction) parallel to a direction in which a pair of front supports 23 of each of the blades 20 described below are aligned. The pair of side walls 10*a* extend in a direction (Y direction) perpendicular to the direction in which the pair of front supports 23 are aligned and parallel to the main surfaces 20*a* of the blades 20. The base end 10*b* connects base ends (portions on the Y2 direction side) of the pair of side walls 10*a*. The base end 10*b* has a shape that is convexly curved toward the base end side (the Y2 direction side). The pair of side walls 10*a* and the base end 10*b* are provided in a U-shape, as viewed in the direction (Z direction) perpendicular to the main surfaces 20*a* of the blades 20.

The blades 20 are thin support plates that support the substrates W. Each of the blades 20 includes the front supports 23 on the tip end 20*b* side (Y1 direction side) and rear supports 24 on the base end 20*c* side (Y2 direction side). The blade 20 has a shape in which the tip end 20*b* side is bifurcated. In the blade 20, the pair of front supports 23 are distributed to the bifurcated portions. The pair of front supports 23 each have a plurality of (two) support surfaces at different heights. A pair of rear supports 24 each have a support surface at a height substantially the same as the heights of the lower (Z2 direction side) support surfaces of the pair of front supports 23. The "height" refers to a distance from the main surfaces 20*a* of the blades 20 in the direction (Z direction) perpendicular to the main surfaces 20*a* of the blades 20.

The pair of front supports 23 and the pair of rear supports 24 are provided on the main surface 20*a* of each blade 20. The support surfaces of the pair of front supports 23 and the pair of rear supports 24 support the rear surface (the surface on the Z2 direction side) of the outer peripheral edge of a substantially circular substrate W from below.

Figure 4:
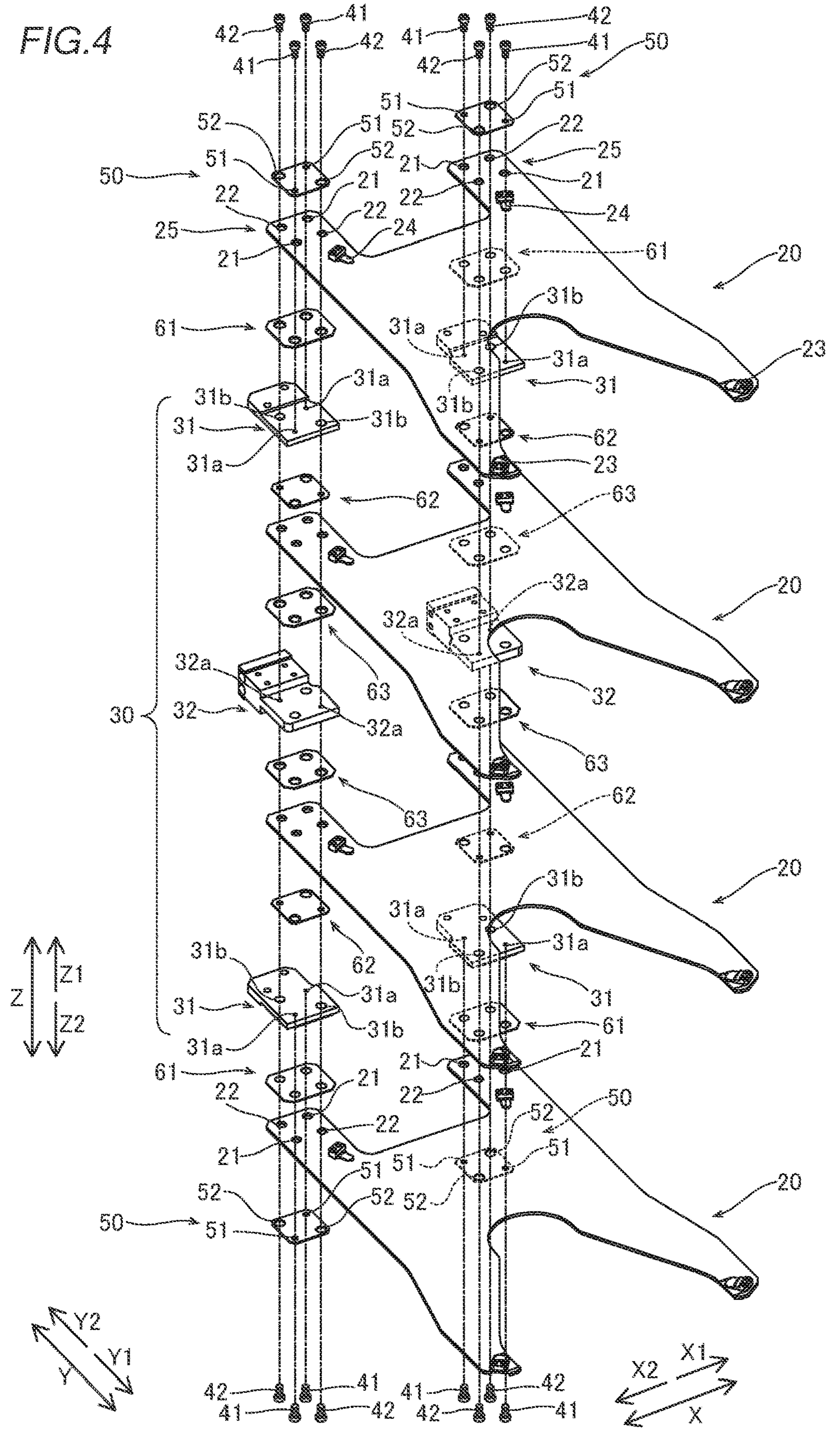
FIG. 4 is an exploded perspective view showing the configuration of blades and mounting members according to the first embodiment of the present invention.

As shown in FIGS. 3 and 4, each of the blades 20 further includes fixing portions 25 including the insertion holes 21 and the insertion holes 22 and attached to the mounting members 30. The fixing portions 25 are provided at the base end 20*c* of the blade 20. The fixing portions 25 include a pair of fixing portions 25. The pair of fixing portions 25 are provided on one side (X1 direction side) and the other side (X2 direction side) in the direction (X direction) in which the pair of front supports 23 are aligned.

The mounting members 30 includes a pair of mounting members 30 so as to correspond to the pair of fixing portions 25. The pair of mounting members 30 are laterally attached to the side walls 10*a* of the frame 10. Specifically, the mounting member 30 on the X1 direction side is attached to a tip end-side portion of the side wall 10*a* on the X1 direction side of the frame 10 from the outer side (X1 direction side). Furthermore, the fixing portion 25 on the X1 direction side of each of the plurality of blades 20 is attached to the mounting member 30 on the X1 direction side. The mounting member 30 on the X2 direction side is attached to a tip end-side portion of the side wall 10*a* on the X2 direction side of the frame 10 from the outer side (X2 direction side). Furthermore, the fixing portion 25 on the X2 direction side of each of the plurality of blades 20 is attached to the mounting member 30 on the X2 direction side.

Figure 5:
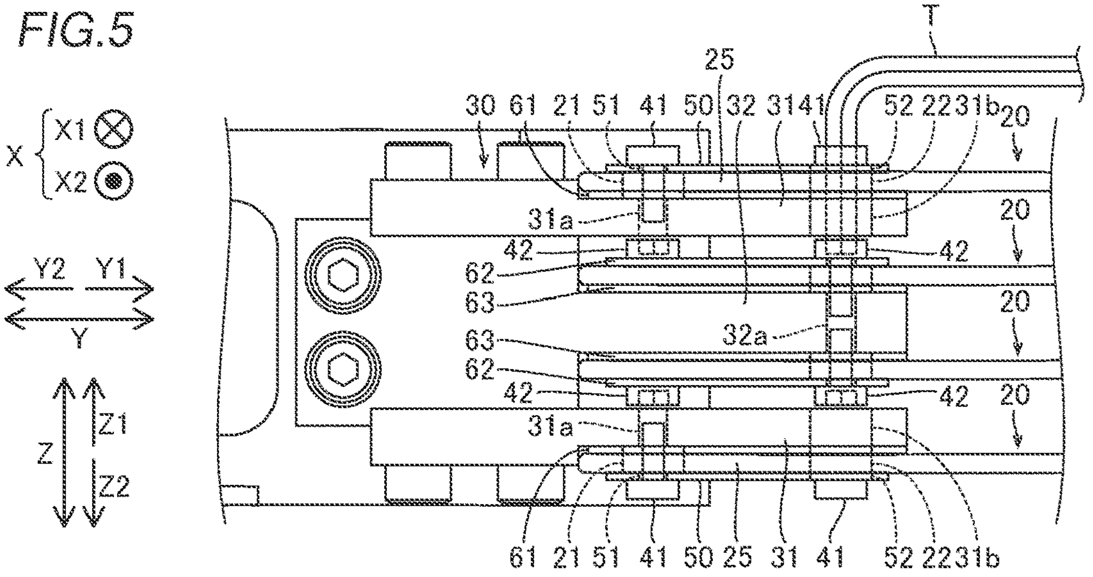
FIG. 5 is a side view for illustrating the configuration of the blades and the mounting member according to the first embodiment of the present invention.
Figure 6:
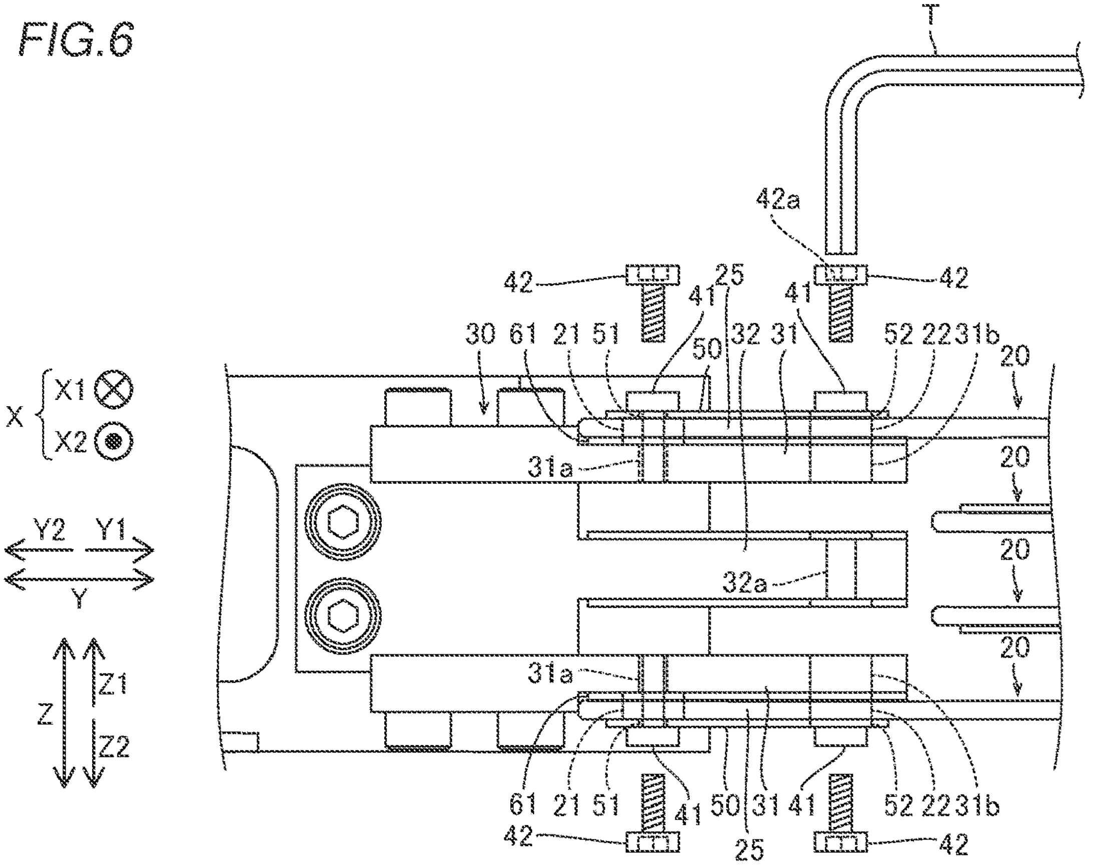
FIG. 6 is a side view for illustrating removal of intermediate blades from the mounting member according to the first embodiment of the present invention.
Figure 7:
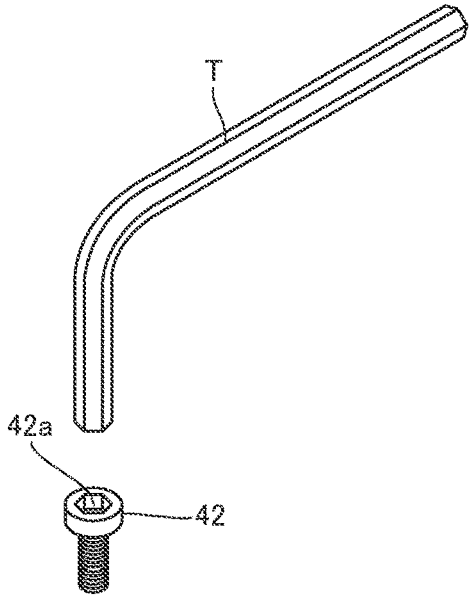
FIG. 7 is a perspective view showing a fastening member and a tool according to the first embodiment of the present invention.
Figure 8:
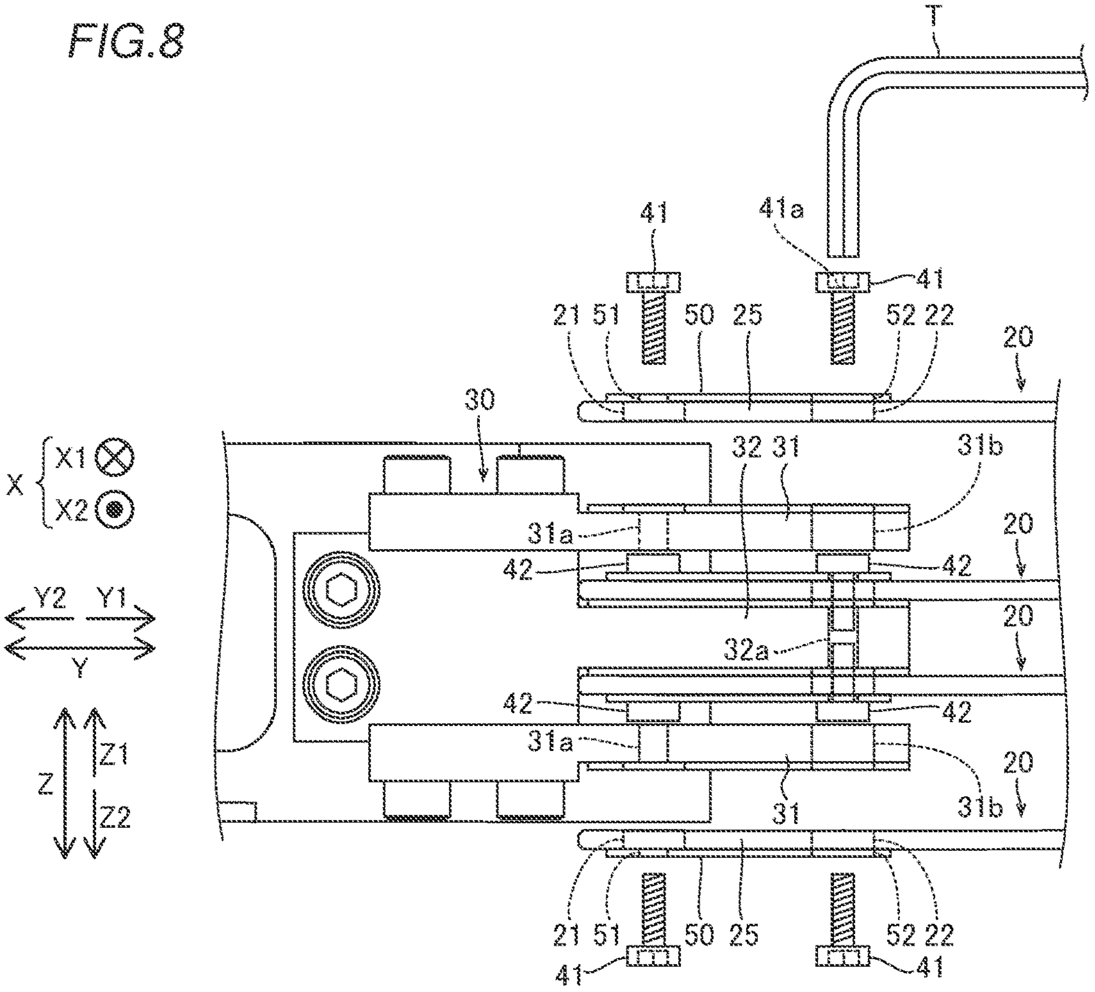
FIG. 8 is a side view for illustrating removal of end blades from the mounting member according to the first embodiment of the present invention.

As shown in FIGS. 4 to 6, each of the mounting members 30 includes two first supports 31 and one second support 32. The first supports 31 and the second support 32 extend from the frame 10 side (Y2 direction side) toward the tip ends 20*b* (Y1 direction side) of the blades 20. The two first supports 31 are provided on the first side (Z1 direction side) and the second side (Z2 direction side) with respect to the second support 32 in the direction (Z direction) perpendicular to the main surfaces 20*a* of the blades 20. The upper (Z1 direction side) first support 31 supports the upper (Z1 direction side) end blade (first stage blade) 20 on the upper surface side. The lower (Z2 direction side) first support 31 supports the lower (Z2 direction side) end blade (second stage blade) 20 on the lower surface side. The second support 32 supports the intermediate blades (second stage and third stage blades) 20 on the upper surface side and the lower surface side.

As shown in FIGS. 5 and 6, when the upper (Z1 direction side) intermediate blade (second stage blade) 20 is removed from the mounting members 30, the tool T is inserted into the insertion holes 22 of the upper (Z1 direction side) end blade (first stage blade) 20 and the insertion holes 31*b* of the upper (Z1 direction side) first support 31 of each of the mounting members 30 from the upper side (Z1 direction side) toward the lower side (Z2 direction side). Then, the tip end of the tool T is inserted into the hexagonal holes 42*a* of the fastening members 42 that have been fastened to the fastening holes 32*a* of the second support 32 of each of the mounting members 30. Before the tool T is inserted into the insertion holes 22 and the insertion holes 31*b*, the heads of the fastening members 42 are exposed through the insertion holes 22 and the insertion holes 31*b* as viewed from above (Z1 direction side) such that the fastening members 42 can be removed by the tool T.

After the removal operation (an operation to loosen the fastening members 42 and remove them from the fastening holes 32*a*) is performed by the tool T, the fastening members 42 are removed (taken out) from the lower side (Z2 direction side) toward the upper side (Z1 direction side) through the insertion holes 22 and the insertion holes 31*b*. Then, the upper (Z1 direction side) intermediate blade 20 is moved so as to be pulled out in a state in which fastening and fixing of the upper (Z1 direction side) intermediate blade 20 to the second support 32 of each of the mounting members 30 by the fastening members 42 is released. Consequently, the upper (Z1 direction side) intermediate blade (second stage blade) 20 is removed from the second support 32 of each of the mounting members 30 while the upper (Z1 direction side) end blade (first stage blade) 20 is attached to the upper (Z1 direction side) first support 31 of each of the mounting members 30.

The procedure is similar when the lower (Z2 direction side) intermediate blade (third stage blade) 20 is removed from the mounting members 30. That is, the tool T is inserted into the insertion holes 22 of the lower (Z2 direction side) end blade (fourth stage blade) 20 and the insertion holes 31*b* of the lower (Z2 direction side) first support 31 of each of the mounting members 30 from the lower side (Z2 direction side) toward the upper side (Z1 direction side). Then, the tip end of the tool T is inserted into the hexagonal holes 42*a* of the fastening members 42 that have been fastened to the fastening holes 32*a* of the second support 32 of each of the mounting members 30. Before the tool T is inserted into the insertion holes 22 and the insertion holes 31*b*, as viewed from below (Z2 direction side), the heads of the fastening members 42 are exposed through the insertion holes 22 and the insertion holes 31*b* such that the fastening members 42 can be removed by the tool T.

After the removal operation (an operation to loosen the fastening members 42 and remove them from the fastening holes 32*a*) is performed by the tool T, the fastening members 42 are removed (taken out) from the upper side (Z1 direction side) toward the lower side (Z2 direction side) through the insertion holes 22 and the insertion holes 31*b*. Then, the lower (Z2 direction side) intermediate blade 20 is moved so as to be pulled out in a state in which fastening and fixing of the lower (Z2 direction side) intermediate blade 20 to the second support 32 of each of the mounting members 30 by the fastening members 42 is released. Consequently, the lower (Z2 direction side) intermediate blade (third stage blade) 20 is removed from the second support 32 of each of the mounting members 30 while the lower (Z2 direction side) end blade (fourth stage blade) 20 is attached to the lower (Z2 direction side) first support 31 of each of the mounting members 30. The second stage blade 20 and the third stage blade 20 can be removed independently of each other.

As shown in FIGS. 4 to 6, the substrate holding hand 1 further includes plates 61 to 63 in addition to the plates 50. The plates 50 are sandwiched between the heads of the fastening members 41 and the end blades 20 in the direction (Z direction) perpendicular to the main surfaces 20*a* of the blades 20. The plates 61 are sandwiched between the end blades 20 and the first supports 31 of the mounting members 30 in the direction (Z direction) perpendicular to the main surfaces 20*a* of the blades 20. The plates 62 are sandwiched between the heads of the fastening members 42 and the intermediate blades 20 in the direction (Z direction) perpendicular to the main surfaces 20*a* of the blades 20. The plates 63 are sandwiched between the intermediate blades 20 and the second supports 32 of the mounting members 30 in the direction (Z direction) perpendicular to the main surfaces 20*a* of the blades 20. Although detailed description is omitted, each of the plates 61 to 63 include insertion holes through which the fastening members 41 or 42 are inserted.

As shown in FIGS. 2 and 3, the substrate holding hand 1 further includes a movable support unit 71 that moves back and forth to support the substrates W, and first and second movable pressing units 72 and 73 that move back and forth to press the substrates W. The movable support unit 71 includes pairs of support members 71*a* that support the substrates W, and an air cylinder 71*b* corresponding to an actuator that moves the pairs of support members 71*a* back and forth in the Y direction. In the movable support unit 71, the pairs of support members 71*a* can be moved forward in the Y1 direction by the air cylinder 71*b* to be placed at support positions at which the pairs of support members 71*a* support the substrates W. Furthermore, in the movable support unit 71, the pairs of support members 71*a* can be moved backward in the Y2 direction by the air cylinder 71*b* to be placed at retracted positions at which the pairs of support members 71*a* do not support the substrates W. The pairs of support members 71*a* have support surfaces at heights substantially the same as the heights of the upper (Z1 direction side) support surfaces of the pairs of front supports 23. Each support surface of the pairs of support members 71*a* supports the rear surface (the surface on the Z2 direction side) of the outer peripheral edge of the substantially circular substrate W from below.

The first movable pressing unit 72 includes a pair of pressing members 72*a* that press the substrates W, and an air cylinder 72*b* corresponding to an actuator that moves the pair of pressing members 72*a* back and forth in the Y direction. In the first movable pressing unit 72, the pair of pressing members 72*a* can be moved forward in the Y1 direction by the air cylinder 72*b* to press the substrates W. Furthermore, in the first movable pressing unit 72, the pair of pressing members 72*a* can be moved backward in the Y2 direction by the air cylinder 72*b* to be placed at retracted positions at which the pair of pressing members 72*a* do not press the substrates W.

The second movable pressing unit 73 includes a pair of pressing members 73*a* that press the substrates W, and an air cylinder 73*b* corresponding to an actuator that moves the pair of pressing members 73*a* back and forth in the Y direction. In the second movable pressing unit 73, the pair of pressing members 73*a* can be moved forward in the Y1 direction by the air cylinder 73*b* to press the substrates W. Furthermore, in the second movable pressing unit 73, the pair of pressing members 73*a* can be moved backward in the Y2 direction by the air cylinder 73*b* to be placed at retracted positions at which the pair of pressing members 73*a* do not press the substrates W.

In the substrate holding hand 1, the upper (Z1 direction side) support surfaces of the pairs of front supports 23 and the support surfaces of the pairs of support members 71*a* of the movable support unit 71 support the processed (washed) substrates W. The pair of pressing members 72*a* of the first movable pressing unit 72 press the processed (washed) substrates W supported by the upper (Z1 direction side)

support surfaces of the pairs of front supports 23 and the support surfaces of the pairs of support members 71*a* of the movable support unit 71.

In the substrate holding hand 1, the lower (Z2 direction side) support surfaces of the pairs of front supports 23 and the support surfaces of the pairs of rear supports 24 support the substrates W prior to processing (washing). The pair of pressing members 73*a* of the second movable pressing unit 73 press the substrates W prior to processing (washing) supported by the lower (Z2 direction side) support surfaces of the pairs of front supports 23 and the support surfaces of the pairs of rear supports 24. The pairs of front supports 23, the pairs of rear supports 24, the movable support unit 71, the first movable pressing unit 72, and the second movable pressing unit 73 are used properly for the substrates W prior to processing (washing) and the processed (washed) substrates W.

The air cylinder 71*b* of the movable support unit 71, the air cylinder 72*b* of the first movable pressing unit 72, and the air cylinder 73*b* of the second movable pressing unit 73 are arranged on the inside of the frame 10. The air cylinder 71*b* of the movable support unit 71, the air cylinder 72*b* of the first movable pressing unit 72, and the air cylinder 73*b* of the second movable pressing unit 73 are aligned in the direction (Z direction) perpendicular to the main surfaces 20*a* of the blades 20 on the inside of the frame 10. Specifically, the air cylinder 71*b* of the movable support unit 71, the air cylinder 72*b* of the first movable pressing unit 72, and the air cylinder 73*b* of the second movable pressing unit 73 overlap each other, as viewed in the direction (Z direction) perpendicular to the main surfaces 20*a* of the blades 20. Therefore, the air cylinders 71*b*, 72*b*, and 73*b* are not aligned in the width direction (X direction) of the frame 10, and thus the air cylinders 71*b*, 72*b*, and 73*b* can be compactly arranged in the width direction (X direction) of the frame 10.

The substrate holding hand 1 further includes a cover (casing) 80 (see FIG. 2) separately from the frame 10. The cover 80 covers the frame 10 and portions (portions arranged on the inside of the frame 10) of the movable support unit 71, the first movable pressing unit 72, and the second movable pressing unit 73.

Advantages of First Embodiment

According to the first embodiment, the following advantages are achieved.

According to the first embodiment, as described above, among the plurality of blades 20, the intermediate blades 20 are removable from the mounting members 30 while the end blades 20 located at the ends in the direction perpendicular to the main surfaces 20*a* of the blades 20 are attached to the mounting members 30. Accordingly, unlike a case in which it is necessary to collectively remove the plurality of blades 20, the intermediate blades 20 can be removed from the mounting members 30 while the end blades 20 are attached to the mounting members 30, and thus the intermediate blades 20 can be removed from the mounting members 30 while the levels (horizontal states) of the end blades 20 are maintained to perform work such as maintenance on the intermediate blades 20.

According to the first embodiment, as described above, the end blades 20 include the insertion holes 21 to allow the fastening members 41 that fasten and fix the end blades 20 to the mounting members 30 to be inserted therethrough, and the insertion holes 22 to allow the fastening members 42 that fasten and fix the intermediate blades 20 to the mounting members 30 to be inserted therethrough and to allow the fastening members 42 to be exposed as viewed in the direction perpendicular to the main surfaces 20*a* of the blades 20. The intermediate blades 20 are removable from the mounting members 30 while the end blades 20 are attached to the mounting members 30 by the fastening members 41 by removing, through the insertion holes 22, the fastening members 42 exposed through the insertion holes 22 as viewed in the direction perpendicular to the main surfaces 20*a* of the blades 20. Accordingly, the intermediate blades 20 can be easily removed from the mounting members 30 only by removing the fastening members 42 through the insertion holes 22, and thus work such as maintenance on the intermediate blades 20 can be easily performed.

According to the first embodiment, as described above, the insertion holes 22 have a size to allow the tool T to be inserted thereinto to remove the fastening members 42. Accordingly, the tool T can be easily inserted into the insertion holes 22 to remove the fastening members 42, and thus the fastening members 42 can be easily removed by the tool T inserted into the insertion holes 22.

According to the first embodiment, as described above, the insertion holes 22 have a size to allow the fastening members 42 to be inserted thereinto. Accordingly, the fastening members 42 can be easily inserted into the insertion holes 22 when the intermediate blades 20 are attached to the mounting members 30. Furthermore, the fastening members 42 can be easily taken out from the insertion holes 22 when the intermediate blades 20 are removed from the mounting members 30. Consequently, it is possible to easily attach the intermediate blades 20 to the mounting members 30 and remove the intermediate blades 20 from the mounting members 30.

According to the first embodiment, as described above, the fastening members 41 are exposed while being inserted through the insertion holes 21. The end blades 20 are removable from the mounting members 30 while the intermediate blades 20 are attached to the mounting members 30 by the fastening members 42 by removing the exposed fastening members 41. Accordingly, the end blades 20 can be removed from the mounting members 30 while the intermediate blades 20 are attached to the mounting members 30, and thus the end blades 20 can be removed from the mounting members 30 while the levels (horizontal states) of the intermediate blades 20 are maintained to perform work such as maintenance on the end blades 20.

According to the first embodiment, as described above, each of the mounting members 30 includes the first supports 31 to support the end blades 20 and the second support 32 to support the intermediate blades 20. The first supports 31 include the fastening holes 31*a* overlapping the insertion holes 21 in the direction perpendicular to the main surfaces 20*a* of the blades 20 to allow the fastening members 41 inserted through the insertion holes 21 to be fastened thereto, and the insertion holes 31*b* overlapping the insertion holes 22 in the direction perpendicular to the main surfaces 20*a* of the blades 20 to allow the fastening members 42 inserted through the insertion holes 22 to be inserted therethrough. The second support 32 includes the fastening holes 32*a* overlapping the insertion holes 22 and the insertion holes 31*b* in the direction perpendicular to the main surfaces 20*a* of the blades 20 to allow the fastening members 42 to be fastened thereto. Accordingly, the fastening members 42 can be removed through the insertion holes 22 and the insertion holes 31*b*, and thus the intermediate blades 20 can be removed from the second support 32 of each of the mounting members 30 while the end blades 20 are attached to the first supports 31 of each of the mounting members 30.

According to the first embodiment, as described above, the second support 32 supports the intermediate blades 20 adjacent to each other in the direction perpendicular to the main surfaces 20*a* of the blades 20 in common. Accordingly, unlike a case in which a support is provided individually for each intermediate blade 20 to support the intermediate blades 20 adjacent to each other in the direction perpendicular to the main surfaces 20*a* of the blades 20, it is not necessary to provide a support for each intermediate blade 20, and thus the structure of the mounting members 30 can be simplified.

According to the first embodiment, as described above, the insertion holes 21 include the pairs of insertion holes 21. The insertion holes 22 include the pairs of insertion holes 22. The pairs of insertion holes 21 and the pairs of insertion holes 22 are arranged at the corners of the rectangles, and are arranged on the different diagonal lines of the rectangles. Accordingly, pairs of fastening members 41 corresponding to the pairs of insertion holes 21 and pairs of fastening members 42 corresponding to the pairs of insertion holes 22 are arranged at the corners of the rectangles, and are arranged on the different diagonal lines of the rectangles such that the end blades 20 and the intermediate blades 20 can be fastened and fixed to the mounting members 30, and thus the end blades 20 and the intermediate blades 20 can be fastened and fixed in a well-balanced manner.

According to the first embodiment, as described above, the substrate holding hand 1 further includes the plates 50 including the insertion holes 51 overlapping the insertion holes 21 in the direction perpendicular to the main surfaces 20*a* of the blades 20 to allow the fastening members 41 to be inserted therethrough, and the insertion holes 52 overlapping the insertion holes 22 in the direction perpendicular to the main surfaces 20*a* of the blades 20 to allow the fastening members 42 to be inserted therethrough. The end blades 20 are fastened and fixed by the fastening members 41 via the plates 50. Accordingly, the end blades 20 can be fastened and fixed by the fastening members 41 via the plates 50, and thus direct application of a fastening and fixing force of the fastening members 41 to the end blades 20 can be reduced or prevented. Even when the end blades 20 are fastened and fixed by the fastening members 41 via the plates 50, the fastening members 42 can be removed through the insertion holes 22 and the insertion holes 52, and thus the intermediate blades 20 can be removed from the mounting members 30 while the end blades 20 are attached to the mounting members 30.

According to the first embodiment, as described above, among the plurality of blades 20, the intermediate blades 20 are removable from the mounting members 30 while the end blades 20 are attached to the mounting members 30 on both of the first side and the second side in the direction perpendicular to the main surfaces 20*a* of the blades 20. Accordingly, the intermediate blades 20 can be removed from the mounting members 30 while the end blades 20 are attached to the mounting members 30 on both of the first side and the second side in the direction perpendicular to the main surfaces 20*a* of the blades 20, and thus work such as maintenance on the intermediate blades 20 can be more easily performed.

According to the first embodiment, as described above, the intermediate blades 20 are adjacent to the end blades 20 in the direction perpendicular to the main surfaces 20*a* of the blades 20. Accordingly, the blades 20 adjacent to the end blades 20 can be removed from the mounting members 30 while the end blades 20 are attached to the mounting members 30, and thus the blades 20 adjacent to the end blades 20 can be removed from the mounting members 30 while the levels (horizontal states) of the end blades 20 are maintained to perform work such as maintenance on the blades 20 adjacent to the end blades 20.

Second Embodiment

The configuration of a substrate holding hand 101 according to a second embodiment is now described with reference to FIGS. 9 and 10. In the figures, the same or similar configurations as those of the first embodiment are denoted by the same reference numerals, and detailed description thereof is omitted.

Figure 9:
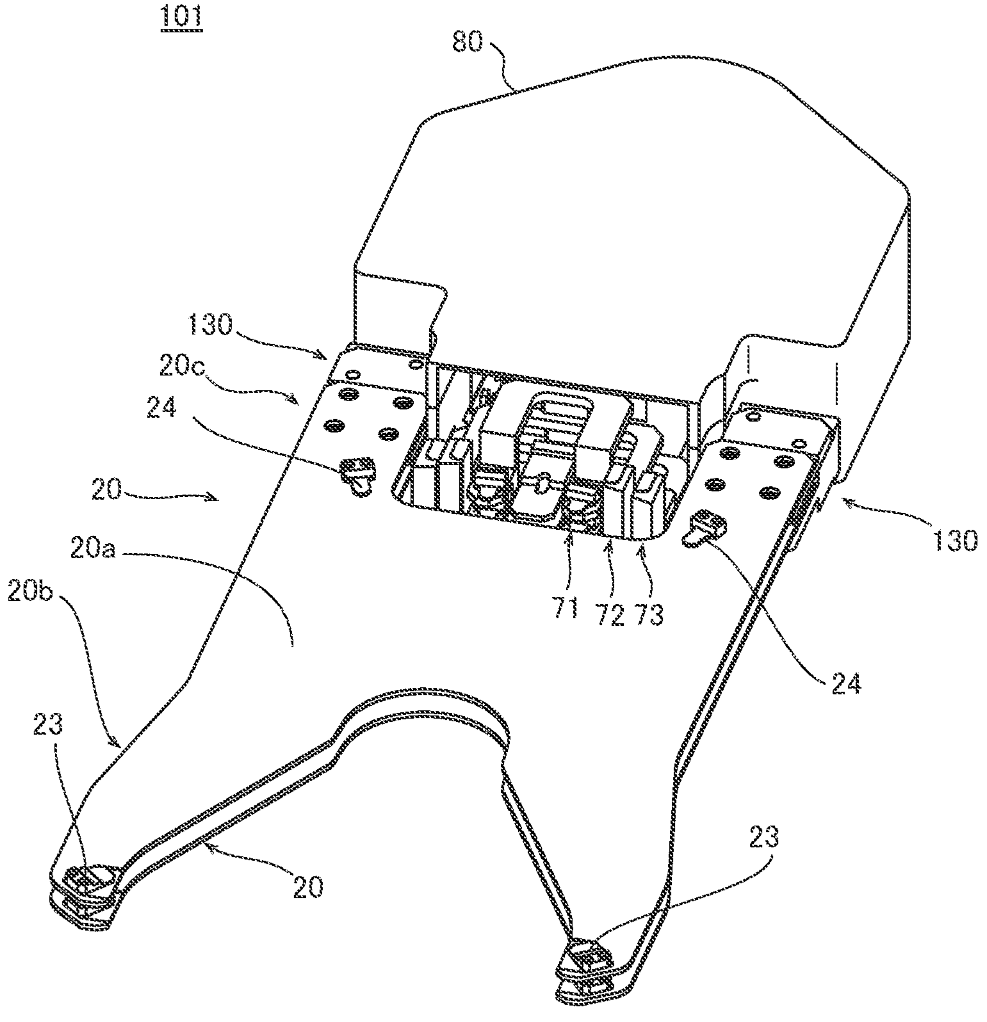
FIG. 9 is a perspective view showing the configuration of a substrate holding hand according to a second embodiment of the present invention.

As shown in FIG. 9, the substrate holding hand 101 includes a frame 10, a plurality of (two) blades 20 to support substrates W, respectively, and mounting members 130 to support the plurality of blades 20 and mount the plurality of blades 20 to the frame 10. The plurality of (two) blades 20 are aligned in a direction (Z direction) perpendicular to the main surfaces 20*a* of the blades 20, the end blade 20 (first stage blade 20) located at the end in the direction (Z direction) perpendicular to the main surfaces 20*a* of the blades 20 and the blade 20 (second stage blade 20) adjacent to the end blade 20 can be removed from the same side (Z1 direction side, upper side) in the direction (Z direction) perpendicular to the main surfaces 20*a* of the blades 20, and the blade 20 adjacent to the end blade 20 can be removed from the mounting members 130 while the end blade 20 is attached to the mounting members 130.

According to the second embodiment, as described above, among the plurality of blades 20, the blade 20 adjacent to the end blade 20 can be removed from the mounting members 130 while the end blade 20 located at the end in the direction (Z direction) perpendicular to the main surfaces 20*a* of the blades 20 is attached to the mounting members 130. Thus, unlike a case in which it is necessary to collectively remove the plurality of blades 20, the blade 20 adjacent to the end blade 20 can be removed from the mounting members 130 while the end blade 20 is attached to the mounting members 130, and thus the blade 20 adjacent to the end blade 20 can be removed from the mounting members 130 while the level (horizontal state) of the end blade 20 is maintained to perform work such as maintenance on the blade 20 adjacent to the end blade 20.

Figure 10:
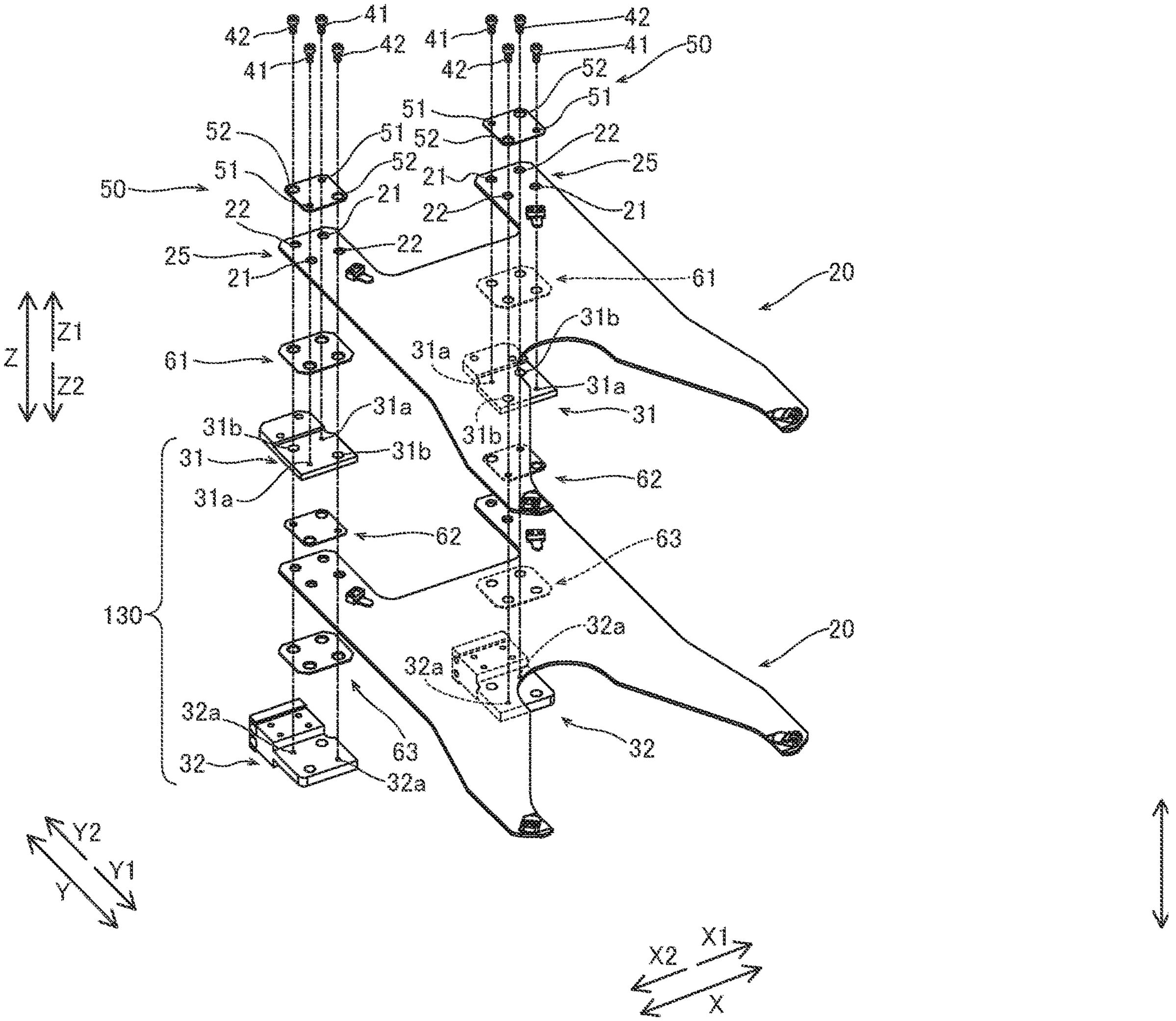
FIG. 10 is an exploded perspective view showing the configuration of blades and mounting members according to the second embodiment of the present invention.

As shown in FIG. 10, the end blade 20 includes insertion holes 21 to allow fastening members 41 that fasten and fix the end blade 20 to the mounting members 130 to be inserted therethrough, and insertion holes 22 to allow fastening members 42 that fasten and fix the blade 20 adjacent to the end blade 20 to the mounting members 130 to be inserted therethrough and to allow the fastening members 42 to be exposed as viewed in the direction (Z direction) perpendicular to the main surfaces 20*a* of the blades 20. A tool (hexagonal wrench) T is inserted into a hexagonal hole 42*a* in the head of each of the fastening members 42 exposed through the insertion holes 22 as viewed in the direction (Z direction) perpendicular to the main surfaces 20*a* of the blades 20 to remove the fastening members 42 through the insertion holes 22 such that the blade 20 adjacent to the end blade 20 can be removed from the mounting members 130 while the end blade 20 is attached to the mounting members 130 by the fastening members 41.

As shown in FIGS. 9 and 10, the substrate holding hand 101 includes the plurality of (two) blades 20. That is, the substrate holding hand 101 can convey (hold) a plurality of (two) substrates W.

The procedure for removing the blade (second stage blade) 20 adjacent to the end blade (first stage blade) 20 from the mounting members 130 is similar to that in the first embodiment. That is, the tool T is inserted into the insertion holes 22 of the end blade (first stage blade) 20 and insertion holes 31*b* of a first support 31 of each of the mounting members 130 from the upper side (Z1 direction side) toward the lower side (Z2 direction side). Then, the tip end of the tool T is inserted into the hexagonal holes 42*a* of the fastening members 42 that have been fastened to fastening holes 32*a* of a second support 32 of each of the mounting members 130. Before the tool T is inserted into the insertion holes 22 and the insertion holes 31*b*, the heads of the fastening members 42 are exposed through the insertion holes 22 and the insertion holes 31*b* as viewed from above (Z1 direction side) such that the fastening members 42 can be removed by the tool T.

After the removal operation (an operation to loosen the fastening members 42 and remove them from the fastening holes 32*a*) is performed by the tool T, the fastening members 42 are removed (taken out) from the lower side (Z2 direction side) toward the upper side (Z1 direction side) through the insertion holes 22 and the insertion holes 31*b*. Then, the blade 20 adjacent to the end blade 20 is moved so as to be pulled out in a state in which fastening and fixing of the blade 20 adjacent to the end blade 20 to the second support 32 of each of the mounting members 130 by the fastening members 42 is released. Consequently, the blade (second stage blade) 20 adjacent to the end blade (first stage blade) 20 is removed from the second support 32 of each of the mounting members 130 while the end blade 20 is attached to the first support 31 of each of the mounting members 130.

The remaining configurations of the second embodiment are similar to those of the first embodiment.

Advantages of Second Embodiment

According to the second embodiment, the following advantages are achieved.

According to the second embodiment, as described above, among the plurality of blades 20, the blade 20 adjacent to the end blade 20 are removable from the mounting members 130 while the end blade 20 located at the ends in the direction perpendicular to the main surfaces 20*a* of the blades 20 is attached to the mounting members 130. Accordingly, unlike a case in which it is necessary to collectively remove the plurality of blades 20, the blade 20 adjacent to the end blade 20 can be removed from the mounting members 130 while the end blade 20 is 20 attached to the mounting members 130, and thus the blade adjacent to the end blade 20 can be removed from the mounting members 130 while the level (horizontal state) of the end blade 20 is maintained to perform work such as maintenance on the blade 20 adjacent to the end blade 20.

According to the second embodiment, as described above, the end blade 20 includes the insertion holes 21 to allow the fastening members 41 that fasten and fix the end blade 20 to the mounting members 130 to be inserted therethrough, and the insertion holes 22 to allow the fastening members 42 that fasten and fix the blade 20 adjacent to the end blade 20 to the mounting members 130 to be inserted therethrough and to allow the fastening members 42 to be exposed as viewed in the direction perpendicular to the main surfaces 20*a* of the blades 20. The blade 20 adjacent to the end blade 20 is removable from the mounting members 130 while the end blade 20 is attached to the mounting members 130 by the fastening members 41 by removing, through the insertion holes 22, the fastening members 42 exposed through the insertion holes 22 as viewed in the direction perpendicular to the main surfaces 20*a* of the blades 20. Accordingly, the blade 20 adjacent to the end blade 20 can be easily removed from the mounting members 130 only by removing the fastening members 42 through the insertion holes 22, and thus work such as maintenance on the blade 20 adjacent to the end blade 20 can be easily performed.

The remaining advantages of the second embodiment are similar to those of the first embodiment.

Modified Examples

The embodiments disclosed this time must be considered as illustrative in all points and not restrictive. The scope of the present invention is not shown by the above description of the embodiments but by the scope of claims for patent, and all modifications (modified examples) within the meaning and scope equivalent to the scope of claims for patent are further included.

For example, while the example in which the arm is a horizontal articulated robot arm has been shown in each of the aforementioned first and second embodiments, the present invention is not limited to this. For example, the arm may be an arm other than a horizontal articulated robot arm, such as a vertical articulated robot arm.

While the example in which the substrate holding hand includes four blades has been shown in the aforementioned first embodiment, the present invention is not limited to this. For example, the substrate holding hand may include a plurality of blade other than four.

While the example in which each of the blades has a bifurcated shape has been shown in each of the aforementioned first and second embodiments, the present invention is not limited to this. For example, each of the blades may have a shape other than a bifurcated shape.

While the example in which each of the blades can support two substrates at different heights has been shown in each of the aforementioned first and second embodiments, the present invention is not limited to this. For example, each of the blades may be able to support only one substrate (able to support a substrate at only one height).

While the example in which the movable support unit is provided has been shown in each of the aforementioned first and second embodiments, the present invention is not limited to this. For example, the movable support unit may not be provided.

While the example in which the movable support unit includes pairs of support members has been shown in each of the aforementioned first and second embodiments, the present invention is not limited to this. For example, the movable support unit may include one support member.

While the example in which two pressing units, which are the first movable pressing unit and the second movable pressing unit, are provided has been shown in each of the aforementioned first and second embodiments, the present invention is not limited to this. For example, only one movable pressing unit may be provided.

While the example in which each of the movable pressing units includes a pair of pressing members has been shown in each of the aforementioned first and second embodiments, the present invention is not limited to this. For example, each of the movable pressing units may include one pressing member.

While the example in which the intermediate blades are blades respectively adjacent to (immediately adjacent to) the end blades in the direction perpendicular to the main surfaces of the blades has been shown in the aforementioned first embodiment, the present invention is not limited to this. For example, the intermediate blades may include a blade adjacent to (immediately adjacent to) the end blade(s) and a blade adjacent to the end blade(s) with one or more blades interposed between it and the end blade(s) in the direction perpendicular to the main surfaces of the blades. That is, each of the blade immediately adjacent to the end blade(s) and the blade adjacent to the end blade(s) with one or more blades interposed between it and the end blade(s) may be removable from the same side (the upper side, for example) in the direction perpendicular to the main surfaces of the blades while the end blade(s) is attached to the mounting members.

While the example in which each of the mounting members includes the second support to support the intermediate blades adjacent to each other in the direction perpendicular to the main surfaces of the blades in common has been shown in the aforementioned first embodiment, the present invention is not limited to this. For example, each of the mounting members may include a plurality of second supports to support the intermediate blades, respectively.

While the example in which a pair of (two) insertion holes (first insertion holes) and a pair of (two) other insertion holes (second insertion holes) are provided to allow the fastening members (first fastening members) that fasten and fix the end blade(s) to be inserted therethrough and to allow the fastening members (second fastening members) that fasten and fix the intermediate blade(s) to be inserted therethrough, respectively, has been shown in each of the aforementioned first and second embodiments, the present invention is not limited to this. For example, one or three or more first insertion holes (first fastening members) and one or three or more second insertion holes (second fastening members) may be provided.

While the example in which the end blade(s) is fastened and fixed by the fastening members via the plates has been shown in each of the aforementioned first and second embodiments, the present invention is not limited to this. For example, the end blade(s) may be fastened and fixed by the fastening members without the plates.

While the example in which among the plurality of blades, the intermediate blades are removable from the mounting members while the end blades are attached to the mounting members on both of the first side and the second side in the direction perpendicular to the main surfaces of the blades has been shown in the aforementioned first embodiment, the present invention is not limited to this. For example, among the plurality of blades, the intermediate blades may be removable from the mounting members while the end blade is attached to the mounting members on only one of the first side and the second side in the direction perpendicular to the main surfaces of the blades.

DESCRIPTION OF REFERENCE NUMERALS

1: substrate holding hand
2: arm
10: frame
20: blade
**20*a***: main surface
21: insertion hole (first insertion hole)
22: insertion hole (second insertion hole)
130: mounting member
31: first support
**31*a***: fastening hole (first fastening hole)
**31*b***: insertion hole (third insertion hole)
32: second support
**32*a***: fastening hole (second fastening hole)
41: fastening member (first fastening member)
42: fastening member (second fastening member)
50: plate
51: insertion hole (fourth insertion hole)
52: insertion hole (fifth insertion hole)
100: substrate conveying robot
W: substrate

The invention claimed is:

1. A substrate holding hand comprising:
a frame;
a plurality of blades each to support a substrate; and
a mounting member to support the plurality of blades and mount the plurality of blades to the frame; wherein
the plurality of blades are aligned in a direction perpendicular to main surfaces of the blades;
an intermediate blade of the plurality of blades is removable from the mounting member while an end blade of the plurality of blades located at an end in the direction perpendicular to the main surfaces of the blades is attached to the mounting member;
the end blade includes a first insertion hole to allow a first fastening member that fastens and fixes the end blade to the mounting member to be inserted therethrough, and a second insertion hole to allow a second fastening member that fastens and fixes the intermediate blade to the mounting member to be inserted therethrough and to allow the second fastening member to be exposed as viewed in the direction perpendicular to the main surfaces of the blades; and
the intermediate blade is removable from the mounting member while the end blade is attached to the mounting member by the first fastening member by removing, through the second insertion hole, the second fastening member exposed through the second insertion hole as viewed in the direction perpendicular to the main surfaces of the blades.

2. The substrate holding hand according to claim 1, wherein the second insertion hole has a size to allow a tool to be inserted thereinto to remove the second fastening member.

3. The substrate holding hand according to claim 2, wherein the second insertion hole has a size to allow the second fastening member to be inserted thereinto.

4. The substrate holding hand according to claim 1, wherein
the first fastening member is exposed while being inserted through the first insertion hole; and
the end blade is removable from the mounting member while the intermediate blade is attached to the mounting member by the second fastening member by removing the first fastening member.

5. The substrate holding hand according to claim 1, wherein
the mounting member includes a first support to support the end blade and a second support to support the intermediate blade;
the first support includes a first fastening hole overlapping the first insertion hole in the direction perpendicular to the main surfaces of the blades to allow the first fastening member inserted through the first insertion hole to be fastened thereto, and a third insertion hole overlapping the second insertion hole in the direction perpendicular to the main surfaces of the blades to allow the second fastening member inserted through the second insertion hole to be inserted therethrough; and the second support includes a second fastening hole overlapping the second insertion hole and the third insertion hole in the direction perpendicular to the main surfaces of the blades to allow the second fastening member to be fastened thereto.

6. The substrate holding hand according to claim 5, wherein the intermediate blade is a plurality of intermediate blades, and the second support supports the plurality of intermediate blades that are adjacent to each other in the direction perpendicular to the main surfaces of the blades.

7. The substrate holding hand according to claim 1, wherein the first insertion hole includes a pair of first insertion holes;

the second insertion hole includes a pair of second insertion holes; and the pair of first insertion holes and the pair of second insertion holes are arranged at corners of a rectangle, and are arranged on different diagonal lines of the rectangle.

8. The substrate holding hand according to claim 1, further comprising:

a plate including a fourth insertion hole overlapping the first insertion hole in the direction perpendicular to the main surfaces of the blades to allow the first fastening member to be inserted therethrough, and a fifth insertion hole overlapping the second insertion hole in the direction perpendicular to the main surfaces of the blades to allow the second fastening member to be inserted therethrough; wherein the end blade is fastened and fixed by the first fastening member via the plate.

9. The substrate holding hand according to claim 1, wherein the intermediate blade is removable from the mounting member while the end blade is attached to the mounting member on a first side in the direction perpendicular to the main surfaces of the blades and another end blade is attached to the mounting member on a second side in the direction perpendicular to the main surfaces of the blades.

10. The substrate holding hand according to claim 1, wherein the intermediate blade is adjacent to the end blade in the direction perpendicular to the main surfaces of the blades.

11. A substrate holding hand comprising:

a frame;

a plurality of blades each to support a substrate; and a mounting member to support the plurality of blades and mount the plurality of blades to the frame; wherein the plurality of blades are aligned in a direction perpendicular to main surfaces of the blades;

an end blade of the plurality of blades located at an end in the direction perpendicular to the main surfaces of the blades and a blade of the plurality of blades adjacent to the end blade are removable from a same side in the direction perpendicular to the main surfaces of the blades;

the blade adjacent to the end blade is removable from the mounting member while the end blade is attached to the mounting member;

the end blade includes a first insertion hole to allow a first fastening member that fastens and fixes the end blade to the mounting member to be inserted therethrough, and a second insertion hole to allow a second fastening member that fastens and fixes the blade adjacent to the end blade to the mounting member to be inserted therethrough and to allow the second fastening member to be exposed as viewed in the direction perpendicular to the main surfaces of the blades; and the blade adjacent to the end blade is removable from the mounting member while the end blade is attached to the mounting member by the first fastening member by removing, through the second insertion hole, the second fastening member exposed through the second insertion hole as viewed in the direction perpendicular to the main surfaces of the blades.

12. A substrate conveying robot comprising:

a substrate holding hand; and an arm to move the substrate holding hand; wherein the substrate holding hand includes:

a frame;

a plurality of blades each to support a substrate; and a mounting member to support the plurality of blades and mount the plurality of blades to the frame;

the plurality of blades are aligned in a direction perpendicular to main surfaces of the blades; and an intermediate blade of the plurality of blades is removable from the mounting member while an end blade of the plurality of blades located at an end in the direction perpendicular to the main surfaces of the blades is attached to the mounting member;

the end blade includes a first insertion hole to allow a first fastening member that fastens and fixes the end blade to the mounting member to be inserted therethrough, and a second insertion hole to allow a second fastening member that fastens and fixes the intermediate blade to the mounting member to be inserted therethrough and to allow the second fastening member to be exposed as viewed in the direction perpendicular to the main surfaces of the blades; and the intermediate blade is removable from the mounting member while the end blade is attached to the mounting member by the first fastening member by removing, through the second insertion hole, the second fastening member exposed through the second insertion hole as viewed in the direction perpendicular to the main surfaces of the blades.

* * * * *